3,193,563
PROCESS FOR THE PREPARATION OF STEROIDAL ETHERS AND THIOETHERS
Alexander D. Cross, Mexico City, Mexico, assignor to Syntex Corporation, Panama, Panama, a corporation of Panama
No Drawing. Filed May 24, 1963, Ser. No. 282,848
18 Claims. (Cl. 260—397)

This invention relates to a novel process for the preparation of cyclopentanopolyhydrophenanthrene derivatives, as well as to said cyclopentanopolyhydrophenanthrene derivatives themselves.

More particularly, this invention relates to a novel process for the preparation of the corresponding steroidal ethers and thioethers from ketals, monothioketals and dithioketals (mercaptols) of keto derivatives of the androstane, estrane, pregnane and 19-norpregnane series, and preferably from such keto derivatives wherein the ketal, monothioketals and dithioketal groups are present at one or more of positions 3, 17 and 20, or from acetals, monothioacetals and dithioacetals (mercaptals) of aldehyde derivatives of the androstane, estrane, pregnane and 19-norpregnane series, and preferably from such aldehyde derivatives wherein the acetal, monothioacetal and dithioacetal groups are at the 19-position.

The process of the present invention can be illustrated by the following reaction sequences:

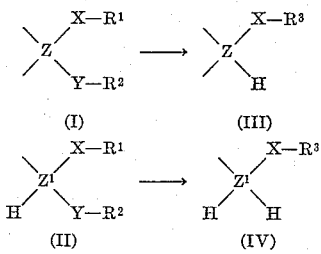

In the above Formulas I–IV, Z represents a secondary carbon atom in a steroid of the androstane, estrane, pregnane or 19-norpregnane series, especially a carbon atom at the 3, 17 or 20-position, to which a ketonic oxygen had been attached prior to the formation of a ketal, monothioketal or dithioketal derivative thereof; $Z^1$ represents a primary carbon atom in a steroid of the androstane, estrane, pregnane or 19-norpregnane series, especially a carbon atom at the 19-position, to which an aldehydic oxygen had been attached prior to the formation of an acetal, monothioacetal or dithioacetal derivative thereof; X and Y each represent either oxygen or sulfur; $R^1$ and $R^2$, when taken separately, each represent a hydrocarbon residue of up to 10 carbon atoms, while $R^1$ and $R^2$ taken together represent a hydrocarbon residue containing from 2 to 10 carbon atoms, inclusive, and $R^3$ represents a hydrocarbon residue of up to 10 carbon atoms or a hydroxyhydrocarbon or mercaptohydrocarbon residue containing from 2 to 10 carbon atoms, inclusive.

The hydrocarbon residues represented by $R^1$ and $R^2$ can be aliphatic, including saturated or unsaturated straight and branched chain aliphatic, cyclo-aliphatic, including saturated or unsaturated cycloaliphatic, or aromatic, including aryl, alkaryl and aralkyl. Furthermore, when the steroidal ketal, monothioketal, dithioketal, acetal, monothioacetal or dithioacetal starting material is formed using a monohydric alcohol or thiol, these hydrocarbon residues will be monovalent radicals, such as methyl, ethyl, propyl, isopropyl, butyl, isobutyl, t-butyl, hexyl, octyl, decyl, cyclohexyl, methylcyclohexyl, cyclohexenyl, benzyl, and the like. Similarly, when the steroid starting material is formed using a dihydric alcohol, a dithiool or a monothioglycol, these hydrocarbon residues will be divalent residues, such as ethylene, i.e.,

—CH$_2$—CH$_2$— propylene, butylene, but-1-enylene, but-1-inylene, 2-methylbutylene, 2,3-dimethylbutylene, 2-methylbut-2-enylene, 2,3-dimethylbut - 2 - enylene, 2,3-dimethylpentylene, 2,3-dimethylpent-2-enylene, hexamethylene, octamethylene, isooctalene, 2,3-dimethylheptalene, 2-methyl-3-ethylheptalene, isooct-2-enylene, 2,3-dimethylhept-2-enylene, 2-methyl-3-ethylhept-2-enylene, and the like.

The monovalent hydrocarbon residues represented by $R^3$, being derived from a hydrocarbon residue represented by $R^1$, $R^2$ or $R^1$ and $R^2$ taken together, can also be aliphatic, cycloaliphatic or aromatic. However, the hydrocarbon residues represented by $R^3$ can also contain a hydroxyl or a mercapto group. Thus, in addition to the monovalent hydrocarbon residues set forth hereinabove for $R^1$ and $R^2$ and, in the case of the aforementioned divalent hydrocarbon residues represented by $R^1$ and $R^2$ taken together, their monovalent counterparts, e.g., 2-methylbutyl rather than 2-methylbutylene, $R^3$ can also represent groups such as β-hydroxyethyl, β-mercaptoethyl, 3-hydroxyhex-2-yl, 6-hydroxyhexyl, 6-mercaptohexyl, and the like.

As previously indicated, the steroid starting materials used in practicing the present invention are ketals, monothioketals and dithioketals of keto derivatives, and acetals, monothioacetals and dithioacetals of aldehyde derivatives, of the androstane, estrane, pregnane and 19-norpregnane series. Although starting materials having ketal, monothioketal or dithioketal groups at one or more of positions 3, 17 and 20, or acetal, monothioacetal or dithioacetal groups at position 19 are preferred, starting materials having such groups at any position on the steroid nucleus, e.g., ketal groups and the like at the 11-, 15- or 16-position or acetal groups and the like at the 2-, 17- or 18-position, can be employed. Similarly, a wide variety of other non-interfering substituents can also be present on the steroid nucleus and, therefore, in the final products, e.g., at the 2-, 4-, 6-, 7-, 9-, 11-, 12-, 14-, 15-, 16- and 21-positions. Thus, for example, hydroxyl groups can be present at the 2-, 4-, 6-, 9-, 11-, 12-, 14-, 15-, 16- and 21-positions, alkyl groups at 2-, 4-, 6-, 7-, 9-, 11-, 12- or 16-position, and so on. It should be noted that positions and substituents just mentioned are intended to be illustrative rather than restrictive.

The starting materials employed in practicing the present invention are prepared by conventional procedures, involving reaction of the corresponding steroidal ketones and aldehydes with a monohydric alcohol, such as methanol, ethanol, propanol, t-butanol, hexanol, cyclohexanol, octanol, benzyl alcohol, and the like, a dihydric alcohol, such as ethylene glycol, propylene glycol-1,2, propylene glycol-1,3, butanediol-1,3, butanediol-1,4, hexanediol-1,6, hexanediol-2,3, heptamethylene glycol, octamethylene glycol, and the like, a thiol, such as ethanethiol, propanethiol, 1-butanethiol, and the like, a dithiol, such as ethanedithiol-1,2, prapanedithiol-1,3, butanedithiol-1,3, butanedithiol-1,3, and the like, or a monothioglycol, such as β-mercaptoethanol, γ-mercaptopropanol, 1-mercaptopropanol-2, δ-mercaptobutanol, anl the like, in the presence of an acid, such as p-toluenesulfonic acid and the like.

In accordance with the present invention there may be readily prepared a number of useful steroid ethers and thioethers which are produced only with great difficulty by other methods. Examples of compounds which may be easily produced by the process of the present invention are: 17β-(cyclohexyloxy)-3β-hydroxy-androstane, which has a favorable anabolic-androgenic ratio with very few undesirable side effects, 17β-(6'-hydroxyhexyloxy)-3-hydroxy-Δ$^{1,3,5(10)}$-estratriene, 17β-(2'-hydroxyethylthio)-3- hydroxy-$\Delta^{1,3,5(10)}$-estratriene, 17$\beta$-(2'-mercaptoethylthio)-3-hydroxy-$\Delta^{1,3,5(10)}$-estriatriene, 17$\beta$-(2'-hydroxyethoxy)-3-methoxy-$\Delta^{1,3,5(10)}$-estratriene and 20$\beta$-(2'-hydroxyethoxy)-3$\beta$-hydroxy-$\Delta^5$ pregnene, all of which are of great utility in lowering the cholesterol level in the blood, 3$\beta$, 17$\beta$, 19-tri(2'-hydroxyethoxy)-$\Delta^5$-androstene, which is useful in the treatment of premenstrual tension, suppresses the output of the pituitary gland and lowers the blood cholesterol level.

The conversion of the aforementioned steroidal ketals, monothioketals, dithioketals, acetals, monothioacetals and dithioacetals to the corresponding steroidal ethers and thioethers is accomplished through the use of a cleaving agent which imay be any of:

(1) A hydride of an element of subgroup III–A of the Periodic Chart, such as boron hydride (or diborane and the like), aluminum hydride, and the like;

(2) A hydride of an element of subgroup III–A of the Periodic Chart together with a Lewis acid free from active hydrogen containing an element having an atomic number of 26 to 28 inclusive or an element of subgroup III–A of the Periodic Chart, such as ferric chloride, boron trifluoride, boron trichcloride, aluminum fluoride, aluminum chloride, aluminum bromide, gallium chloride, and the like;

(3) A hydride of an element of subgroup III–A of the Periodic Chart together with a hydrogen halide, such as hydrogen fluoride, hydrogen chloride, hydrogen bromide, and the like;

(4) An alkali metal hydride, such as lithium hydride, sodium hydride, potassium hydride, and the like, together with a Lewis acid free from active hydrogen containing an element of subgroup III–A of the Periodic Chart, such as boron trifluoride, aluminum trichloride, boron trichloride and the like;

(5) An alkaline earth metal hydride, such as magnesium hydride, calcium hydride, and the like, together with a Lewis acid free from active hydrogen containing an element of subgroup III–A of the Periodic Chart, such as boron trifluoride, boron trichloride, aluminum trichloride and the like;

(6) A double metal hydride containing at least one element of subgroup III–A of the Periodic Chart, such as lithium aluminum hydride, potassium aluminum hydride, magnesium aluminum hydride, lithium gallium hydride, zinc aluminum hydride, sodium borohydride, potassium borohydride, aluminum borohydride, and the like, together with a Lewis acid free from active hydrogen containing an element having an atomic number of 26 to 28 inclusive or an element of subgroup III–A of the Periodic Chart, such as boron trichloride, boron trifluoride, aluminum trichloride and the like;

(7) A double metal hydride, containing at least one element of subgroup III–A of the Periodic Chart, together with a hydrogen halide.

In practicing the process of the present invention, a compound represented by Formula I or II is treated with a cleaving agent described above in an organic solvent free from active hydrogen, preferably comprising an ether function, such as ethyl ether, tetrahydrofuran, dioxane etc., thus affording the corresponding ether or thioether represented by Formula III or IV.

When the starting compound is a cyclic monothio(ketal or acetal), the reductive cleavage occurs on the oxygen linkage, thus affording a thioether with an hydroxyl substituent. For example, 17-cycloethylenedioxy-3-hydroxy-$\Delta^{1,3,5(10)}$-estratriene affords 17$\beta$-(2'-hydroxyethoxy)-3-hydroxy-$\Delta^{1,3,5(10)}$-estratriene.

When the starting compound is a cyclic dithio(ketal or acetal) the final compound is a thioether with a mercapto substituent. For instance, 20-(cycloethylenedithio)-3$\beta$-hydroxy-$\Delta^5$-pregnene furnishes 20$\beta$-(2'-mercaptoethylthio)-3$\beta$-hydroxy-$\Delta^5$-pregnene.

It is known to those skilled in the art that ketone or aldehyde groups present as such on the molecule of the starting compound, are reduced to the corresponding alcohols under the conditions of the present process.

The conditions at which the process of the present invention may be carried out have no critical importance and may be changed within wide ranges. For example, the temperature may vary from approximately ambient to the reflux temperature of the reaction mixture; the time may be from about 30 minutes to about 24 hours, thus having only an influence on the yield of final product but not on its nature. The amount of reagent of the type described above with respect to the steroid reactant, may range from approximately 0.25 molar equivalent of each ingredient, to large excesses, the latter being preferred for better yields in final compound. The ratio of one ingredient with respect to the other, e.g., the metal hydride with respect to the Lewis acid or hydrogen halide must not necessarily be constant and may vary from approximately 1:1 to large excesses of Lewis acid or hydrogen halide.

Similarly, the isolation of the final product has no critical importance and may be effected by conventional procedures.

The following specific examples serve to illustrate but are not intended to limit the scope of the present invention.

*Example I*

A mixture of 5 g. of estrone, 150 cc. of anhydrous benzene, 60 cc. of ethyleneglycol distilled over sodium hydroxide and 800 mg. of p-toluenesulfonic acid monohydrate was refluxed for 12 hours with the use of an adapter for the continuous removal of the water formed during the reaction. Aqueous sodium bicarbonate solution was added to the cooled mixture and the organic phase was separated, washed with water, dried over anhydrous sodium sulfate and evaporated to dryness. The residue crystallized from acetone-hexane to give 17-cycloethylenedioxy-3-hydroxy-$\Delta^{1,3,5(10)}$-estratriene (Cpd. No. 1).

The starting compounds listed hereinafter under A, were treated following the same procedure, thus affording the corresponding products set forth below, under B.

| A | Cpd. No. | B |
|---|---|---|
| Estrone methyl ether | 2 | 17-cycloethylenedioxy-3-methoxy-$\Delta^{1,3,5(10)}$-estratriene. |
| Dihydrotestosterone | 3 | 3-cycloethylenedioxy-17$\beta$-hydroxy-androstane. |
| Testosterone | 4 | 3-cycloethylenedioxy-17$\beta$-hydroxy-$\Delta^5$-androstene. |
| 17$\alpha$-methyl-dehydro-testosterone. | 5 | 3-cycloethylenedioxy-17$\beta$-hydroxy-17$\alpha$-methyl-androstane. |
| Pregnenolone | 6 | 20-cycloethylenedioxy-3$\beta$-hydroxy-$\Delta^5$-pregnene. |
| Progesterone | 7 | 3,20-biscycloethylenedioxy-$\Delta^5$-pregnene. |
| 19-nor-dihydro-testosterone | 8 | 3-cycloethylenedioxy-17$\beta$-hydroxy-estrane. |
| 19-nor-pregnenolone | 9 | 20-cycloethylenedioxy-3$\beta$-hydroxy-19-nor-$\Delta^5$-pregnene. |
| Allopregnane-3,20-dione | 10 | 3,20-biscycloethylenedioxy-allopregnane. |
| Androstan-3$\beta$-ol-17-one | 11 | 17-cycloethylenedioxy-3$\beta$-hydroxy-androstane. |
| $\Delta^4$-pregnen-19-al-3,20 dione | 12 | 3,19,20-tricycloethylenedioxy-$\Delta^5$-pregnene. |
| $\Delta^4$-androsten-19-al-3,17-dione | 13 | 3,17,19-tricycloethylenedioxy-$\Delta^5$-androstene. |
| 16$\alpha$-methyl-progesterone | 14 | 3,20-biscycloethylenedioxy-16$\alpha$-methyl-$\Delta^5$-pregnene. |

*Example II*

Estrone was treated according to Example I except that ethyleneglycol was substituted by hexamethylene glycol (1,6-hexanediol) thus yielding 17-cyclohexamethylenedioxy-3-hydroxy-$\Delta^{1,3,5(10)}$-estratriene (Cpd. No. 15).

Dihydrotestosterone was treated by the same procedure to give 3-cyclohexamethylenedioxy-17$\beta$-hydroxy-androstane (Cpd. No. 16).

*Example III*

Estrone was treated in accordance with Example I, except that ethylene glycol was substituted by 2,3-hexanediol, thus yielding 17-(hexane-2′,3′-dioxy)-3-hydroxy-$\Delta^{1,3,5(10)}$-estratriene (Cpd. No. 17).

Pregnenolone was treated by the same procedure, thus yielding 20-(hexane-2′,3′-dioxy)-3β-hydroxy-$\Delta^5$-pregnene (Cpd. No. 18).

Example IV

Estrone was treated following the procedure described in Example I, except that ethanol was used instead of ethyleneglycol, thus yielding 17,17-(diethoxy)-3-hydroxy-$\Delta^{1,3,5(10)}$-estratriene (Cpd. No. 19).

Androstan-3β-ol-17-one was treated by the above procedure thus furnishing 17,17-(diethoxy)-3β-hydroxy-androstane (Cpd. No. 20).

Example V

Estrone was treated according to Example I, except that ethyleneglycol was substituted by propanol, thus giving 17,17 - (dipropoxy) - 3-hydroxy-$\Delta^{1,3,5(10)}$-estratriene (Cpd. No. 21).

Allopregnane-3,20-dione was treated by the same procedure, thus yielding 3,3;20,20-tetrapropoxy-allopregnane (Cpd. No. 22).

Example VI

Estrone was treated according to Example I, except that ethyleneglycol was substituted by terbutanol thus yielding 17,17-(diterbutanol)-3-hydroxy-$\Delta^{1,3,5(10)}$ - estratriene (Cpd. No. 23).

Dihydrotestosterone was treated by the same procedure, thus giving 3,3-(diterbutoxy)-17β-hydroxy-androstane (Cpd. No. 24).

Example VII

Upon treatment of esterone by the procedure described in Example I, except that ethylene glycol was substituted by β-mercaptoethanol, there was produced 17(cycloethylenethioxy)-3-hydroxy - $\Delta^{1,3,5(10)}$ - estratriene (Cpd. No. 25).

Androstan-3β-ol-17-one was treated by the same procedure to give 17-(cycloethylenethioxy)-3β-hydroxy-androstane (Cpd. No. 26).

Example VIII

When treating estrone by the procedure of Example I, except that ethylene glycol was substituted by 1,2-ethanedithiol, there was produced 17-(cycloethylenedithio)-3-hydroxy-$\Delta^{1,3,5(10)}$-estratriene (Cpd. No. 27).

Prenenolone was treated by the latter procedure to give 20-(cycloethylenedithio)-3β-hydroxy - $\Delta^5$ - pregnene (Cpd. No. 28).

Example IX

Estrone was treated according to Example I, except that ethylene glycol was substituted by ethanethiol, thus yielding 17,17(diethylthio)-3-hydroxy-$\Delta^{1,3,5(10)}$-estratriene (Cpd. No. 29).

Allopregnane-3,20-dione was treated by the same procedure, thus furnishing 3,3;20,20-tetraethylthioallopregnane (Cpd. No. 30).

Example X

A slow stream of diborane mixed with boron trifluoride was passed through a solution of 17-cycloethylenedioxy-3-hydroxy-$\Delta^{1,3,5(10)}$-estratriene (Cpd. No. 1) in 125 cc. of tetrahydrofuran for 5 hours. The excess of diborane was decomposed by careful addition of water. Then 1 lt. of water was added and the formed precipitate was filtered, washed and dried, thus giving 9.6 g. of organoboron compound.

This material was dissolved in 200 cc. of tetrahydrofuran and treated with 9 g. of sodium hydroxide previously dissolved in 25 cc. of water, and 45 cc. of 35% hydrogen peroxide, stirring and keeping the temperature around 15° C. The mixture was stirred for 2 hours, then the precipitated product was filtered, washed, dried and chromatographed on alumina thus producing 17β-(2′-hydroxy ethoxy)-3-hydroxy-$\Delta^{1,3,5(10)}$-estratriene (Cpd. No. 31).

The compounds Nos. 2 and 3 were treated by the same procedure thus yielding respectively: 17β-(2′-hydroxy ethoxy)-3-methoxy-$\Delta^{1,3,5(10)}$-estratriene (Cpd. No. 32), and 3β-(2′-hydroxy ethoxy)-17β - hydroxy - androstane (Cpd. No. 33).

Example XI

The Compounds Nos. 15, 16, 17, 19, 20, 21, 22, 25, 27 and 30 were treated according to the procedure described in Example X, thus furnishing respectively:

Cpd. No.—
  34. 17β-(6′-hydroxyhexyloxy)-3-hydroxy-$\Delta^{1,3,5(10)}$-estratriene,
  35. 3β-(6′-hydroxyhexyloxy)-17β-hydroxy-androstane,
  36. 17β-(3′-hydroxyhexyl-2′-oxy-3-hydroxy-$\Delta^{1,3,5(10)}$-estratriene,
  37. 17β-ethoxy-3-hydroxy-$\Delta^{1,3,5(10)}$-estratriene,
  38. 17β-ethoxy-3β-hydroxy-androstane,
  39. 17β-propoxy-3-hydroxy-$\Delta^{1,3,5(10)}$-estratriene,
  40. 3β,20β-dipropoxy-allopregnane,
  41. 17β-(2′-hydroxyethylthio)-3-hydroxy-$\Delta^{1,3,5(10)}$-estratriene,
  42. 17β-(2′-mercaptoethylthio)-3-hydroxy-$\Delta^{1,3,5(10)}$-estratriene,
  43. 3β,20β-diethylthio-allopregnane.

Example XII

A solution of 1 g. of 17-cycloethylenedioxy-3-hydroxy-$\Delta^{1,3,5,(10)}$-estratriene (Cpd. No. 1), in 50 cc. of tetrahydrofuran was added over a 30 minutes period to a stirred suspension of 1 g. of lithium aluminum hydride and 6 g. of aluminum trichloride in 50 cc. of anhydrous tetrahydrofuran. The mixture was refluxed for 2 hours, then cooled and cautiously treated with 5 cc. of ethyl acetate and 2 cc. of water. Solid sodium sulfate was added, the inorganic material filtered off and thoroughly washed with hot ethyl acetate, the combined organic solutions upon evaporation yielded a crude material, which was purified by crystallization from acetone-hexane thus giving 17β-(2′-hydroxy ethoxy)-3-hydroxy-$\Delta^{1,3,5(10)}$-estratriene, which was identical with Compound No. 31, obtained according to Example X.

Example XIII

A suspension of 5 g. of aluminum tribromide and 2 g. of sodium borohydride in 50 cc. of tetrahydrofuran was added with stirring to a solution of 2 g. of Compound No. 1 in 40 cc. of tetrahydrofuran. The mixture was kept at room temperature overnight, the excess reagent was decomposed by addition of acetic acid, the resulting solution concentrated to small volume in vacuo and diluted with water. The product was extracted with ethyl acetate, the extract washed with water, dried and evaporated. Crystallization of the solid from acetone-hexane gave 17β-(2′-hydroxy ethoxy)-3-hydroxy-$\Delta^{1,3,5(10)}$-estratriene (Cpd. No. 31).

Example XIV

A solution of 1 g. of Compound No. 1 in 50 cc. of anhydrous tetrahydrofuran was added to a stirred suspension of 1 g. of lithium aluminum hydride in 50 cc. of anhydrous tetrahydrofuran then there was passed a stream dry hydrogen chloride during 3 hours with constant stirring at room temperature. The resulting mixture was cautiously treated with 5 cc. of ethyl acetate and 2 cc. of water. After 5 minutes there were further added 100 cc. of ethyl acetate, the resulting mixture was washed successively with water, dilute aqueous sodium bicarbonate solution and water to neutral, then dried over anhydrous sodium sulfate and evaporated to dryness. Recrystallization of the residue from acetone-hexane yielded a product identical with 17β-(2′-hydroxy ethoxy) - 3 - hydroxy-$\Delta^{1,3,5(10)}$-estratriene (Cpd. No. 31).

Example XV

The Compound No. 1 was treated according to Example XII except that lithium aluminum hydride and aluminum trichloride, were respectively substituted by magnesium aluminum hydride and aluminum trifluoride thus yielding a product identical with Compound No. 31.

Example XVI

The Compound No. 1 was treated according to Example XIII except that aluminum tribromide and sodium borohydride were respectively substituted by ferric trichloride and potassium borohydride, thus yielding a product identical with Compound No. 31.

Example XVII

The Compound No. 1 was treated according to Example XIII except that aluminum tribromide was substituted by boron trifluoride dissolved in anhydrous ether, thus furnishing a product identical with Compound No. 31.

Example XVIII

Upon treating Compound No. 1 by the procedure described in Example XIII, but using aluminum borohydride instead of sodium borohydride, there was obtained a product identical with Compound No. 31.

Example XIX

The Compound No. 1 was treated following the procedure described in Example X, except that gaseous boron trifluoride was substituted by boron trichloride dissolved in the reaction mixture, thus yielding exactly the same compound as in said example.

Example XX

The Compound No. 1 was treated in accordance with Example XIV, except that hydrogen chloride was substituted by hydrogen bromide, thus producing the same compound as in said example.

Example XXI

The Compound No. 1 was treated according to Example XIV, but hydrogen fluoride was used instead of hydrogen chloride, to give a product identical with Compound No. 31.

Example XXII

The procedure described in Example XIV was repeated except that the suspension of lithium aluminum hydride was substituted by a solution of aluminum hydride in tetrahydrofuran, thus yielding exactly the same results.

Example XXIII

The procedure of Example XXII was repeated, except that it was carried out without hydrogen chloride thus yielding a product identical with Compound No. 31.

Example XXIV

The procedure described in Example X was repeated except that boron trifluoride was substituted by hydrogen fluoride, thus giving identical results.

Example XXV

The Compound No. 1 was treated according to Example X except that the reaction was carried out in the absence of boron trifluoride, thus yielding a compound identical with Cpd. No. 31.

Example XXVI

The Compound No. 1 was treated following the procedure described in Example X, except that gaseous boron trifluoride was substituted by aluminum trifluoride suspended in the reaction mixture, thus yielding exactly the same compound as in said example.

Example XXVII

The Compound No. 1 was treated according to Example XII, except that lithium aluminum hydride and aluminum trichloride were respectively substituted by lithium gallium hydride and gallium trichloride, thus yielding a product identical with Compound No. 31.

Example XXVIII

A solution of 1 g. of Compound No. 3 in 50 cc. of tetrahydrofuran was added over a 30 minute period to a stirred solution containing 1 g. of aluminum hydride in 50 cc. of anhydrous tetrahydrofuran. The mixture was refluxed for 2 hours, then cooled and cautiously treated with 5 cc. of ethyl acetate and 2 cc. of water. Solid sodium sulfate was added, the inorganic material filtered off and thoroughly washed with hot ethyl acetate, the combined organic solutions upon evaporation yielded a crude material, which was purified by crystallization from acetone-hexane to give 3$\beta$-(2'-hydroxy ethoxy)-17$\beta$-hydroxy-androstane (Cpd. No. 33).

Example XXIX

The Compounds Nos. 2 to 14, inclusive, were treated according to Example XII, thus yielding respectively:

Cpd. No.—
44. 17$\beta$-(2'-hydroxy ethoxy)-3-methoxy-$\Delta^{1,4,5(10)}$-estratriene.
45. 3$\beta$-(2'-hydroxy ethoxy)-17$\beta$-hydroxy-androstane.
46. 3$\beta$-(2'-hydroxy ethoxy)-17$\beta$-hydroxy-$\Delta^5$-androstene.
47. 3$\beta$-(2'-hydroxy ethoxy)-17$\beta$-hydroxy-17$\alpha$-methyl-androstane.
48. 20$\beta$-(2'-hydroxy ethoxy)-3$\beta$-hydroxy-$\Delta^5$-pregnene.
49. 3$\beta$,20$\beta$-bis-(2'-hydroxy ethoxy)-$\Delta^5$-pregnene.
50. 3$\beta$-(2'-hydroxy ethoxy)-3$\beta$-hydroxy-estane.
51. 20$\beta$-(2'-hydroxy ethoxy)-3$\beta$-hydroxy-19-nor-$\Delta^5$-pregnene.
52. 3$\beta$,20$\beta$-bis-(2'-hydroxy ethoxy)-allopregnane.
53. 17$\beta$-(2'-hydroxy ethoxy)-3$\beta$-hydroxy-androstane.
54. 3$\beta$,19,20$\beta$-tri-(2'-hydroxy ethoxy)-$\Delta^5$-pregnene.
55. 3$\beta$,17$\beta$,19-tri-(2'-hydroxy ethoxy)-$\Delta^5$-androstene.
56. 3$\beta$,20$\beta$-bis-(2'-hydroxy-ethoxy)-16$\alpha$-methyl-$\Delta^5$-pregnene.

Example XXX

The Compounds Nos. 15 to 30, inclusive, were treated according to Example XII, thus furnishing respectively:

Cpd. No.—
57. 17$\beta$-(6'-hydroxyhexyloxy)-3-hydroxy-$\Delta^{1,3,5(10)}$-estratriene (identical with Cpd. No. 34),
58. 3$\beta$-(6'-hydroxyhexyloxy)-17$\beta$-hydroxy-androstane (identical with Cpd. No. 35),
59. 17$\beta$-(3'-hydroxyhexyl-2'-oxy)-3-hydroxy-$\Delta^{1,3,5(10)}$-estratriene (identical with Cpd. No. 36),
60. 20$\beta$-(3'-hydroxyhexyl-2'-oxy)-3$\beta$-hydroxy-$\Delta^5$-pregnene,
61. 17$\beta$-ethoxy-3$\beta$-hydroxy-$\Delta^{1,3,5(10)}$-estratriene (identical with Cpd. No. 37),
62. 17$\beta$-ethoxy-3$\beta$-hydroxy-androstane (identical with Cpd. No. 38),
63. 17$\beta$-propoxy-3-hydroxy-$\Delta^{1,3,5(10)}$-estratriene (identical with Cpd. No. 39),
64. 3$\beta$,20$\beta$-dipropoxy-allopregnane (identical with Cpd. No. 40),
65. 17$\beta$-terbutoxy-3-hydroxy-$\Delta^{1,3,5(10)}$-estratriene,
66. 3$\beta$-terbutoxy-17$\beta$-hydroxy-androstane,
67. 17$\beta$-(2'-hydroxyethylthio)-3-hydroxy-$\Delta^{1,3,5(10)}$-estratriene (identical with Cpd. No. 41),
68. 17$\beta$-(2'-hydroxyethylthio)-3$\beta$-hydroxy-androstane,
69. 17$\beta$-(2'-mercaptoethylthio)-3-hydroxy-$\Delta^{1,3,5(10)}$-estratriene (identical with Cpd. No. 42),
70. 20$\beta$-(2'-mercaptoethylthio)-3$\beta$-hydroxy-$\Delta^5$-pregnene,
71. 17$\beta$-ethylthio-3-hydroxy-$\Delta^{1,3,5(10)}$-estratriene,
72. 3$\beta$20$\beta$-diethylthio-allopregnane (identical with Cpd. No. 43).

Example XXXI

The Compound No. 1 was treated according to Example XIV, except that lithium aluminum hydride was substituted by magnesium aluminum hydride, thus yielding a product identical with Compound No. 31.

Example XXXII

The procedure described in Example XIV was repeated, except that zinc aluminum hydride was used instead of lithium aluminum hydride, thus giving exactly the same results.

Example XXXIII

Androstan-3β-ol-17-one was treated according to Example I, except that ethyleneglycol was substituted by cyclohexanol, thus yielding 17,17-di-(cyclohexyloxy)-3β-hydroxy-androstane (Cpd. No. 73) which upon treatment according to Example XII, yielded 17β-(cyclohexyloxy)-3β-hydroxy-androstane (Cpd. No. 74).

Example XXXIV

The Compound No. 1 was treated according to Example XII, except that lithium aluminum hydride was substituted by lithium hydride thus yielding a product identical with Compound No. 31.

Example XXXV

The procedure of Example XIII was repeated, except that boron trifluoride etherate and sodium hydride were respectively used instead of aluminum tribromide and sodium borohydride, thus furnishing exactly the same compound.

Example XXXVI

The Compound No. 1 was treated according to Example XII, except that lithium aluminum hydride was substituted by magnesium hydride thus yielding a product identical with Compound No. 31.

I claim:

1. A process for production of a compound selected from the group consisting of steroidal ethers and thioethers which comprises treating the corresponding compound selected from the group consisting of ketals, monothioketals and dithioketals of ketones selected from the group consisting of the androstane, estrane, pregnane and 19-nor pregnane series and acetals, monothioacetals and dithioacetals of aldehydes selected from the group consisting of the androstane, estrane, pregnane and 19-norpregnane series with a reagent selected from the group consisting of a hydride of an element of subgroup III-A of the Periodic Chart, a hydride of an element of subgroup III-A of the Periodic Chart in the presence of a Lewis acid, an alkali metal hydride and an alkaline earth metal hydride each in the presence of a Lewis acid comprising an element of subgroup III-A of the Periodic Chart, a double metal hydride comprising at least one element of subgroup III-A of the Periodic Chart in the presence of a Lewis acid, a double metal hydride comprising at least one element of subgroup III-A of the Periodic Chart in the presence of a hydrogen halide and a hydride of an element of subgroup III-A of the Periodic Chart in the presence of a hydrogen halide.

2. The process of claim 1 wherein the reagent is lithium aluminum hydride in the presence of a Lewis acid.

3. The process of claim 1 wherein the reagent is sodium borohydride in the presence of a Lewis acid.

4. The process of claim 1 wherein the reagent is aluminum hydride in the presence of a Lewis acid.

5. The process of claim 1 wherein the reagent is diborane in the presence of a Lewis acid.

6. The process of claim 1 wherein the reagent is lithium aluminum hydride in the presence of a hydrogen halide.

7. The process of claim 1 wherein the reagent is sodium borohydride in the presence of a hydrogen halide.

8. The process of claim 1 wherein the reagent is aluminum hydride.

9. The process of claim 1 wherein the reagent is diborane.

10. The process of claim 1 wherein the reagent is lithium hydride in the presence of a Lewis acid comprising an element belonging to subgroup III-A of the Periodic Chart.

11. The process of claim 1 wherein the reagent is sodium hydride in the presence of a Lewis acid comprising an element belonging to subgroup III-A of the Periodic Chart.

12. The process of claim 1 wherein the reagent is magnesium hydride in the presence of a Lewis acid comprising an element belonging to subgroup III-A of the Periodic Chart.

13. The process of claim 2 wherein the Lewis acid is aluminum trichloride.

14. The process of claim 3 wherein the Lewis acid is aluminum tribromide.

15. The process of claim 5 wherein the Lewis acid is boron trifluoride.

16. The process of claim 10 wherein the Lewis acid is aluminum trichloride.

17. The process of claim 11 wherein the Lewis acid is boron trifluoride.

18. The process of claim 12 wherein the Lewis acid is aluminum trichloride.

No references cited.

LEWIS GOTTS, *Primary Examiner.*